United States Patent

[11] 3,571,679

[72] Inventor Jan Van Turnhout
 Delft, Netherlands
[21] Appl. No. 864,755
[22] Filed Oct. 8, 1969
[45] Patented Mar. 23, 1971
[73] Assignee Nederlandse Organisatie voor Toegepast-
 Natuurwetenschappelijk Onderzoek ten
 behoeve van Nijverheid
 Handel en Verkeer, The Hague,
 Netherlands
[32] Priority Oct. 14, 1968
[33] Netherlands
[31] 6814644

[54] DEVICE FOR FORMING ELECTRETS
 1 Claim, 3 Drawing Figs.
[52] U.S. Cl. ........................................................ 317/262
[51] Int. Cl. ......................................................... H01g 7/02
[50] Field of Search ............................................. 317/262, 262 (F)

[56] References Cited
UNITED STATES PATENTS
3,365,633 1/1968 Anderson et al .............. 317/262F Primary Examiner—Lee T. Hix
Attorney—Watson, Cole, Grindle & Watson ABSTRACT: A device for forming electrets with an open structure, which is provided with electrodes which are covered with a material, the specific resistance of which is a factor of $10^4$—$10^8$ smaller than that of the electret material and the thickness of which is chosen such that it can stand the forming voltage applied without the occurrence of a dielectric breakdown.

PATENTED MAR 23 1971  3,571,679

INVENTOR.
Jan van Turnhout
BY
Watson, Cole, Grindle & Watson
Attorneys

DEVICE FOR FORMING ELECTRETS

The invention relates to a device for forming electrets from dielectrics with an open or porous structure, comprising two metal electrodes between which an electric field can be excited and between which the dielectrices can be brought. Such a device is known from the U.S. Pat. No. 2,740,184. By means of this device an electret is formed by keeping a dielectric at raised temperature in an electric field for some time and subsequently allowing it to cool slowly at ambient temperature while maintaining the field, in such a way that as a result it shows permanent electrostatic charges at either end. Such charged dielectrics can be supplied in ranges in which the field, the force or the generation of current from or by an electrostatic charge is required.

The device known in the art has a great drawback. It is difficult, for instance, to give the open electrets a reasonably high permanent charge, by which is meant a charge of two nano Coulomb per square centimeter and preferably more. Such a charge can only be obtained by adjusting the forming voltage of the electrodes to close to the limit of the breakdown strength of the air. In order to prevent the occurrence of breakdown through the air in the pores of the open structure of the dielectric, in practice, it will be necessary to apply considerably lower forming voltages on the electrodes and consequently lower field strengths.

It is the object of the invention to provide a device enabling dielectrics having an open structure, to be supplied, without great difficulties, with a high charge, so with voltages to close to the breakdown strength of the air.

For that purpose the invention is characterized in that at least one electrode is covered and the specific resistance of the cover is a factor of $10^4 - 10^8$ smaller that that of the dielectric to be formed and in that the thickness of that cover is chosen such that it can stand the forming voltage applied without the occurrence of a dielectric breakdown. Because the cover is connected is series with the electrodes in the forming circuit as a high resistance conductor, it functions as a damping, when unexpectedly breakdown through the pores of the dielectric (hereinafter called substance) would occur after all as a result of too high an adjustment of the forming voltage. Moreover said resistance protects the power supply against overload. At a correct adjustment of the forming voltage that as said before must be such that breakdown through the substance just does not occur, gradually, as a result of the behavior of the cover as a conductor, the full voltage appears at the planes of the cover turned towards the substance.

The charge is substantially evenly distributed across the said planes. If, in time, breakdown through the substance occurs locally after all, then charge will move along the surface of the said planes towards the spot.

Because the cover is a bad conductor the field between the planes will not collapse entirely, but only at the spot of the breakdown. Consequently the air breakdown will be confined locally and extinguish itself, because charge supply towards the spot of the breakdown is taking place too slowly.

Consequently the adjustment of the forming voltage to close to the breakdown voltage of the air will, in the device according to the invention in case of a breakdown of the air, not lead to an avalanchelike total short circuit of the forming voltage such as happens with the noncovered metal electrodes known in the art.

The invention will not further be elucidated with reference to a drawing with three figures.

In the FIGS. like numbers refer to like parts. The thermostat is not drawn, the device can be used in every current gas thermostat.

Figure 1:
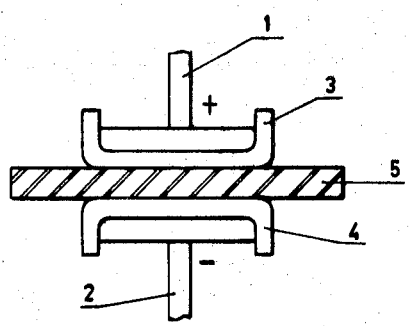
FIG. 1 shows a porous filter mat inserted between two electrodes according to the invention.

In FIG. 1 rounded polished stainless steel electrodes 1 and 2 have a diameter of 40 mm. and are covered with weakly conductive covers 3 and 4 of Sindanyo. Sindanyo is an asbestoscement mixture marketed by the English firm of Turners Asbestos Cement Company Ltd., of Manchester.

Between covers 3 and 4 there is a small filter mat 5 of polyethylene terephthalate fibers, of which an electret has to be made. Filter mat 5 has a 90percent porosity, a diameter of 70 mm., a thickness of 4 mm. and is composed of precipitated fibers of a 3 mm. length at a thickness of 20—25 microns. In order to remove avivage means the fibers have previously been washed with alcohol. The thickness of covers 3 and 4 is 3 mm. Forming filter mat 5 into an electret is carried out as follows:

1. Setup 1 to 5 is slowly brought to about 160° C, for instance in 1 hour, be means of heated air. 2. Electrodes 1 and 2 are connected to a direct current source of 10 $k$ and this condition is continued for approximately 4 hours.

3. While the voltage source remains connected to the electrodes, setup 1 to 5 is cooled in one hour to ambient temperature.

Now the small filter mat can be taken from the setup, it is then found that it has become an electret with a permanent load of about $3.10^{19}$ C/cm$^2$.

As a matter of course other forming conditions can be chosen.

Preferably, however, the temperature should be above 130° C. While the forming time must not be too short in order to assure an even space charge polarization in spite of the transport barriers. In the embodiment discussed the ratio of the resistances of Sindanyo and polyethylene terephthalate is about 1:10$^4$.

It will be clear that a covering material different from Sindanyo can be used. Various weakly conductive inorganic and organic materials are eligible, such as china ware, certain titanates and metal oxides, thermosetting plastics, such as polyester resins mixed with asbestos, polyamides, polyurethanes, polyvinylfluoride, etc. The organic covering materials will be less temperature resistant and more sensitive to thermic breakdown, they are easier to process on the other hand, for instance, in the device according to 1 to 5 nylatron G.S. (manufacturer Polypenco Inc. Reading Penna, U.S.A.) has successfully been applied up to 120° C.

For charging powders the lower coating is provided with a standup rim. In this way, for instance, teflon powder of $100\mu$ has been formed into an electret.

Figure 3:
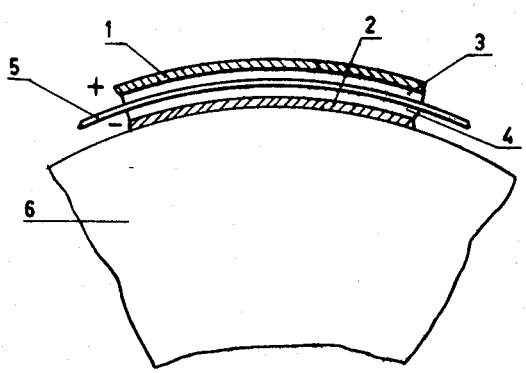
FIG. 3 shows in detail the fiber of FIG. 2, inserted between the two electrodes.

In FIG. 3 hollow winding roller 6 consists of celeron with a diameter of 190 mm. and a length of 200 mm. On the roller an aluminum foil 2 is provided of 50-microns thickness with across it a covering foil 4 of polyamide 11 (rilsan manufacturer Organica Paris) of 50 thickness. On foil 4 a monofilament fiber of which an electret has to be made has been wound closely together. The fibre consists of polypropylene and has a thickness of 20 microns. On the layer of fibers again a rilsan foil and an aluminum foil have been laid. The insertion of the endless fiber between the two electrodes is to be seen in FIG. 3. In order to polarize the fiber for three hours at 120° C. with a voltage of 200 v., the entire setup is placed in a thermostat. Because of the slight fiber-thickness the low voltage was sufficient to generate a permanent charge of $5.10^{10}$ C/cm.$^2$. In this embodiment the ratio of the resistances of rilsan and propylene is about 1:10$^4$. Instead of rilsan polyvinylfluoride, polyvinylchloride and polycelluloseacetate are also suitable as covering films.

If desired, several layers of fibers can be charged simultaneously on the roller according to the invention, by applying again and again new layers of fibers and new layers of covered electrodes, the latter, such as a multiple-layer condenser, allowing an alternate metallic interconnection. Further endless strips can also be wound onto the roller instead of endless threads.

The covered electrodes according to the invention offer the opportunity to charge fibers and foils in a continuous process, for example immediately after spinning, drafting or extruding. For it has been found that in case of formings near the melting point the forming time can be reduced to seconds.

Finally an example of the use of the electrets charged by means of the device will be given.

Figure 2:
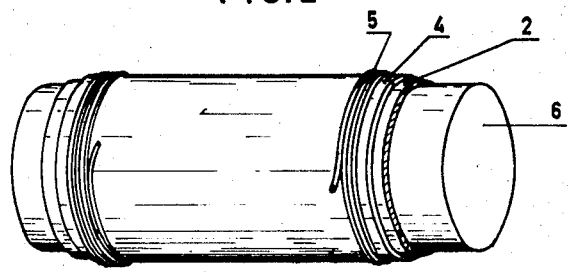
FIG. 2 shows a winding roller with on it one covered metal foil electrode, on which one long-fiber layer is wound. The other covered foil electrode is not drawn for clearness' sake.

Through an electret filter according to FIG. 2 submicron particles of about 0.5 mm. were precipitated for 99.95 at a filtration velocity of 5 cm. sec. The pressure drop across the filter amounted to only 4 mm water gauge (water column). The test was carried out with a dibutylphtalate and a saltaerosol. A noncharged, identical filter precipitated only 30 percent of the same aerosols. Consequently the electrostatic precipitation of the electret fibers increases the filter efficiency considerably; the penetration decreases by not less than 1400 times.

Filters made of endless electret fibers and electret powders also precipitate excellently, with them precipitations of 99 percent were achieved at a pressure drop of respectively 2 and 7.5 mm. water gauge (water column).

The charge of the electret fibers manufactured did not perceptibly decay for half a year. Neither did the filtration properties decline in that period. Therefore their presumable service life is estimated at years.

I claim:
1. A device for forming electrets from dielectrics with an open or porous structure comprising two metal electrodes between which an electric field can be excited and between which the dielectrics can be brought, wherein at least one electrode is covered and the specific resistance of the cover is a factor of $10^4 - 10^8$ smaller than that of the dielectric to be formed and wherein the thickness of the cover is chosen such that it can stand the forming voltage applied without the occurrence of a dielectric breakdown.